US 8,825,296 B2

(12) United States Patent
Mönig et al.

(10) Patent No.: US 8,825,296 B2
(45) Date of Patent: Sep. 2, 2014

(54) METHOD FOR OPERATING A CONTROL SYSTEM OF A MOTORCYCLE

(75) Inventors: Stefan Mönig, Schwelm (DE); Mirko Schindler, Velbert (DE); Matthias Klein, Dachau (DE); Jörg Simon, Wülfrath (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 602 days.

(21) Appl. No.: 13/003,527

(22) PCT Filed: Jul. 10, 2009

(86) PCT No.: PCT/EP2009/058865
§ 371 (c)(1),
(2), (4) Date: Apr. 11, 2011

(87) PCT Pub. No.: WO2010/004045
PCT Pub. Date: Jan. 14, 2010

(65) Prior Publication Data
US 2011/0178679 A1   Jul. 21, 2011

(30) Foreign Application Priority Data

Jul. 11, 2008   (DE) .......................... 10 2008 032 586

(51) Int. Cl.
*B62D 6/00*   (2006.01)
(52) U.S. Cl.
USPC .............................................. 701/41; 70/252
(58) Field of Classification Search
USPC .............. 701/41; 70/252, 182–186; 340/5.61, 340/5.72, 5.64, 5.73, 427, 426.1, 426.13, 340/426.11, 539.1; 180/287; 307/10.3, 9.1
See application file for complete search history.

(56) References Cited

U.S. PATENT DOCUMENTS 5,343,077 A   8/1994   Yoshida et al.
6,806,587 B2 * 10/2004   Konno et al. .................. 307/9.1
(Continued)

FOREIGN PATENT DOCUMENTS

DE   101 15 337 A1   10/2002
DE   101 25 064 A1   11/2002
(Continued)

OTHER PUBLICATIONS

International Search Report dated Mar. 3, 2010 to corresponding International Application No. PCT/EP2009/058865, 6 pages.

(Continued)

*Primary Examiner* — Marthe Marc-Coleman
(74) *Attorney, Agent, or Firm* — Maier & Maier, PLLC

(57) ABSTRACT

The invention relates to a method for operating a control system (63) of a motorcycle (60), which moves an electromechanical steering lock (10) from an unlocked position (1) to a locked position (2) and vice-versa, with an ignition system (62) to start the engine of the motorcycle (60), which is controlled by the control system (63), an authentication (70), in which an ID-generator (64) maintains a data link with the control system (63), wherein after a positive authentication (70) in an operational step (71*a*, 71*b*), the steering lock (10) is brought into the appropriate position (1,2). According to the invention, it is provided that the first actuator element (31) has a signal connection with the control system (63), which is accessible to the user, and the operational step (71*a*, 71*b*) commences only after positive authentication (70) via intentional activation of the first actuator element (31), which occurs after the authentication (70).

15 Claims, 8 Drawing Sheets

(56) References Cited

U.S. PATENT DOCUMENTS

Figure 1:
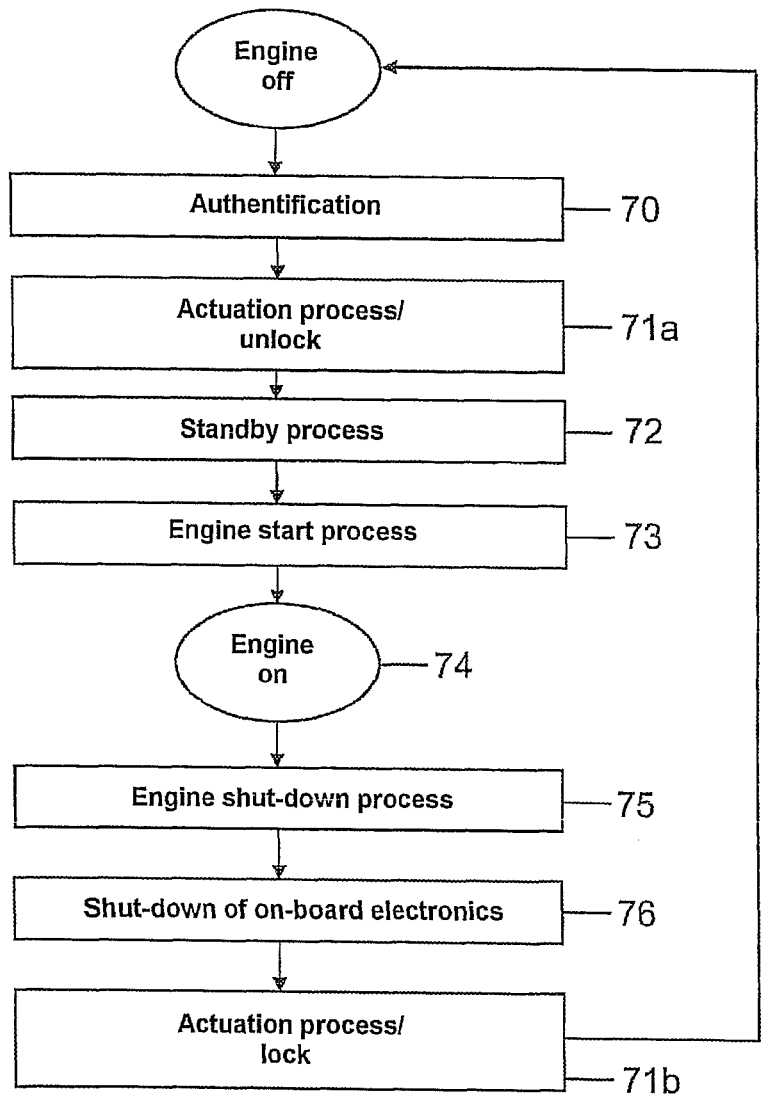

| | | | |
|---|---|---|---|
| 7,042,343 B2 * | 5/2006 | Konno et al. | 340/427 |
| 7,190,255 B2 * | 3/2007 | Konno | 340/5.62 |
| 2003/0080859 A1 | 5/2003 | Tsuji | |
| 2004/0090306 A1 | 5/2004 | Konno et al. | |
| 2006/0261673 A1 | 11/2006 | Unno | |
| 2006/0261674 A1 | 11/2006 | Unno | |
| 2006/0261675 A1 | 11/2006 | Unno | |

FOREIGN PATENT DOCUMENTS

| | | | |
|---|---|---|---|
| DE | 103 56 660 A1 | 7/2005 | |
| DE | 10 2005 062 685 A1 | 7/2007 | |
| DE | 102005062685 * | 7/2007 | B60R 25/04 |
| EP | 17 24 166 A1 | 11/2006 | |
| JP | H03-21574 A | 1/1991 | |
| JP | 2011-517174 A | 9/2013 | |

OTHER PUBLICATIONS

German Search Report issued Jun. 8, 2009 to corresponding German Patent Application No. 10 2008 032 586.4, 4 pages.

Office Action in JP 2011-517174; Dated Sep. 30, 2013.

* cited by examiner

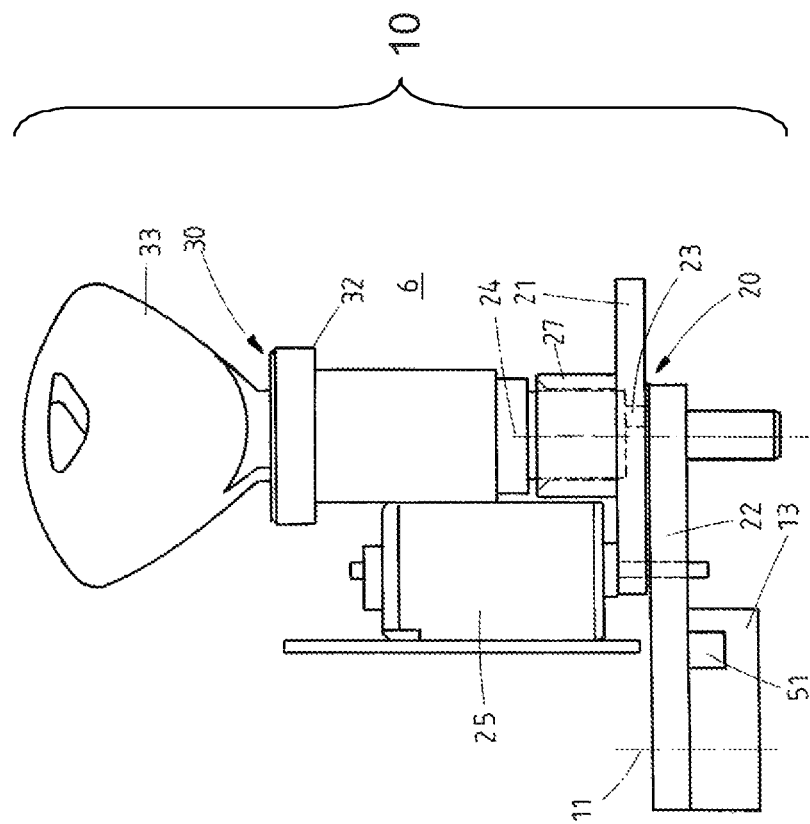
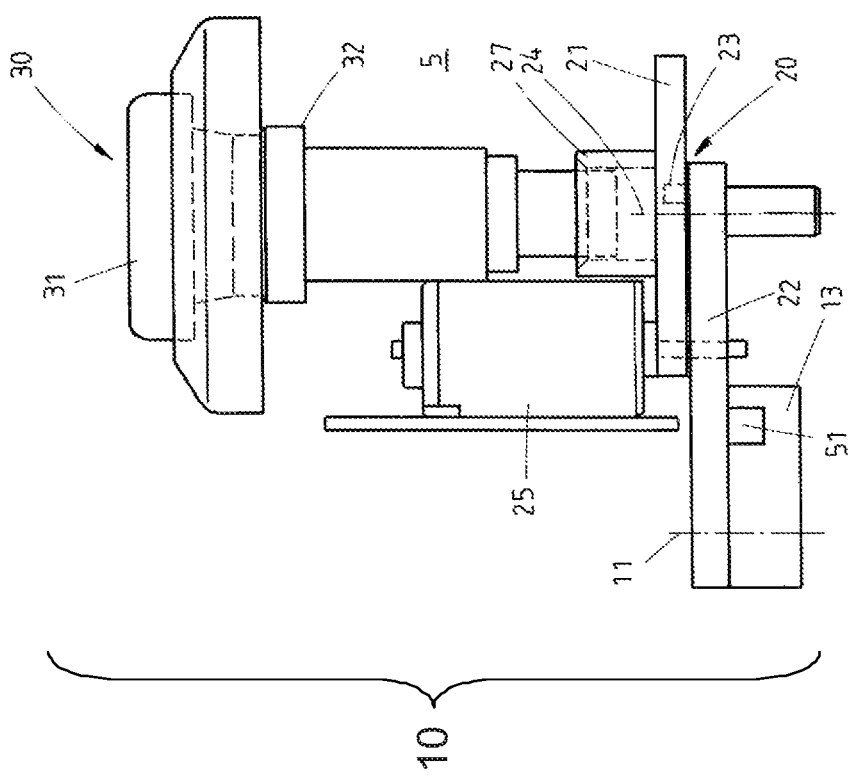

METHOD FOR OPERATING A CONTROL SYSTEM OF A MOTORCYCLE

RELATED APPLICATIONS

This application claims priority, under 35 U.S.C. §119, to International Application No. PCT/EP2009/058865, filed on Jul. 10, 2009 which claims the benefit of German Patent Application No.: DE 10 2008 032 586.4, files on Jul. 11, 2008, the disclosures of which are incorporated by reference herein in its intirety.

The invention relates to a method for operating a control system of a motorcycle, which moves an electromechanical steering lock from an unlocked position to a locked position and vice-versa, with an ignition system to start the engine of the motorcycle, which is controlled by the control system, an authentication, in which an ID-generator maintains a data link with the control system, wherein, after a positive authentication in an operational step, the steering lock is brought into the appropriate position.

DE 100 49 442 A1 discloses a method to establish access authority before the engine ignition of the motorcycle. The actuation of the start button on handlebars of the motorcycle establishes an authentication process, whereby a request signal is transmitted from the motorcycle to the ID-generator. Should the ID-generator be recognized as valid, meaning, if the authentication process is positive, and that means that the electronic code of the ID-generator matches the motorcycle code, then the steering lock, particularly the electromechanical drive-away lock is deactivated. In some instances it was shown that in spite of a positive authentication, an unlock or lock function step, not directly influenced by the user, is not desirable. An example for that is that after the engine of the motorcycle is switched off and the rider has dismounted from the motorcycle, it could for instance be desired that the motorcycle remains in the unlocked position, because it should for example be moved a few feet to the final park position by the user, especially in a garage, with the engine switched off.

The objective of the present invention is to establish a method for operating a control system of a motorcycle to transfer an electromagnetic steering lock in its appropriate position as well as to provide a related system, by which the above-named shortcomings are avoided, which widens the application scope of the steering lock.

As a solution of this task, a method with the characteristics of claim 1 is proposed. The dependent claims depict preferable design improvements.

In the spirit of the invention, it is provided that the method features the first actuator element in signal connection with the control system, which is accessible to the user, and the operational step commences only after a positive authentication via a deliberate activation of the first actuator element, which occurs after the authentication. The authentication can be started unconsciously as well as by a deliberate activation via the first actuation element. If the user with the ID-generator is present in a defined vicinity of the motorcycle, bi-directional communication link between the ID-generator and motorcycle is established, particularly a check between the control system and/or the electromechanical steering lock, to what extent the electronic code of the ID-generator matches the electronic, saved code of the motorcycle. In this context, the bi-directional link can be effected in the optical, inductive or capacitive manner, or an additional option via a radio-signal transmission. Once the positive authentication is established, it is now the user who has to deliberately initiate the actual actuation step, particularly the lock function or the unlock function. In the instance that the user does not activate the actuation element after the positive authentication process, the steering lock remains in its current position. This means, if the motorcycle engine has been switched off and no separate activation of the actuation element is effected by the user, the steering lock of the motorcycle remains in the unlocked position. In the sense of this example, it needs to be added that while the motorcycle engine is switched on, the authentication process always takes place in defined time intervals.

In a preferable embodiment of the invention, a standby process is initiated via a renewed intentional activation of the second actuation element after the actuation process, in which the steering lock has been brought to the unlocked position, and in which the power of the ignition system of the motorcycle is made available, wherein particularly the engine ignition process is activated via a renewed activation of the third actuation element. This means that the user can initiate the engine ignition process by two-time actuation of the respective actuation element.

It is preferable that during the actuation process, the control system checks the actual position of the steering unit against the required position, whereby if the actual position matches the required position, the steering lock is brought from the unlocked position to the locked position. Should the actual position be different from the required position, the actuation process, particularly the locking process, is abandoned. It is practicable that in case of abandoning the actuation process, the user receives a feedback message about erroneous position of the steering unit. For example this feedback message can be generated via a display at the steering unit. Also an acoustic feedback message is conceivable. If the handlebars of the steering unit are not positioned in a defined, turned handlebar position, no movement of the steering lock is carried out from the unlocked position to the locked position. For example, this check can be carried out via caliper elements, sensors, etc, which have a data link with the control system.

According to a further preferable embodiment of the invention, the engine shut-down process (while the engine is in operation) is generated via a deliberate activation of a fourth actuation element, wherein the control system of the ignition unit cuts off the power supply. In this case, the engine shut-down process is generated under defined conditions of the motorcycle, which are monitored by the control system. A possible condition can for instance be that the motorcycle has to show a speed of 0 km/h, that means that it is at rest. The renewed activation of the fifth actuation element after shutting down the engine, causes the on-board electronics to switch off, which is for instance demonstrated by display electronics shutting down. The motorcycle is now in such a status that the engine is shut down and solely "remnant electronics" are supplied with power, which supplies for example the still active authentication process, or that the steering device can be supplied with power. Hereby, the steering lock is still in its unlocked position. Now the user can move the steering lock into the locked position by actuating the process via an additional activation of the first or the second actuation element.

Preferably, the first, the second and the fourth actuation element constitute a joint central actuation element, which is situated on the steering unit, and thus freely accessible to the user. The subject actuation elements can be designed as calipers, switches, movement- or touch-sensors, etc. Furthermore, actuation periods of the central actuation element to activate the actuation process and the standby process can differ from each other. Also the actuation periods of the actuation process and the on-board electronics shut-down can differ from each other. It means, for example that long actuation of the central actuation element can generate an actuation process. A short actuation of the central actuation element can generate the standby process or the shut-down of on-board electronics. In order to be able to recognize a short and long actuation, various sensors, particularly capacity sensors and piezoelectric sensors in the central actuation element can be utilized. After the actuation process, should no activation of the central actuation element or one of the actuation elements take place within a defined timeframe, the control system switches to standby mode.

This objective is furthermore fulfilled by an arrangement to control the steering lock with a locking member of a function-critical construction part, particularly of a steering column of a motorcycle, with a transmission, which is situated in a mechanically effective connection with the locking member, wherein the locking member is movable within the actuation process between a locked position and unlocked position, with an authentication process, in which an ID-generator maintains data link with a control system, wherein after a positive authentication, the steering lock can be brought into the respective position in the actuation step, during which, the locking member meshes into the function-critical construction part in the locked position, and the locking member is disconnected from the function-critical construction part in the unlocked position, wherein an actuation element is provided for the user's access, whereby the actuation process commences by deliberate activation of the actuation element. According to the invention, the control system maintains data link with the steering lock in such a fashion, that the actuation process is only triggered via a conscious activation of the actuation element, which occurs after a positive authentication.

Figure 2:
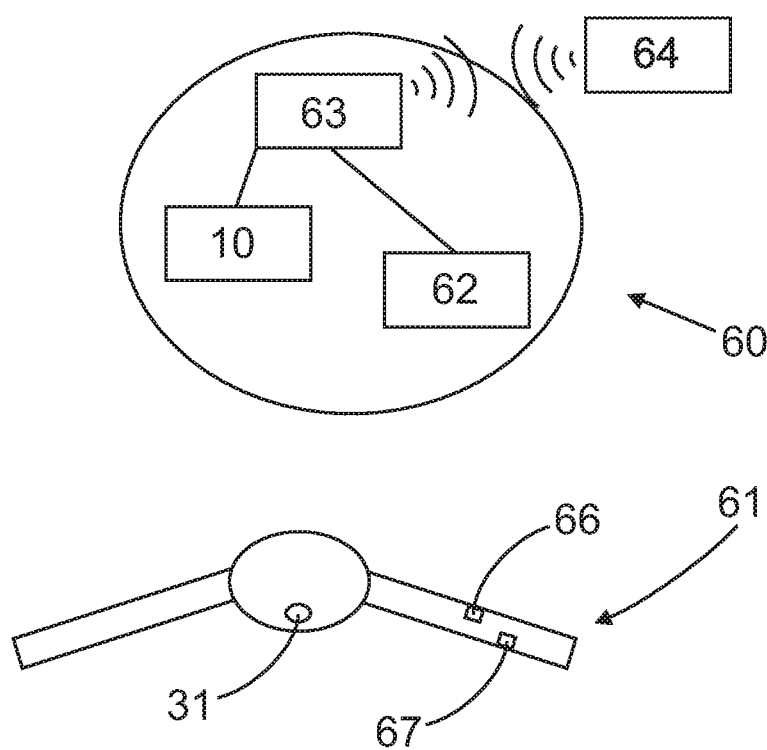
Figure 3:
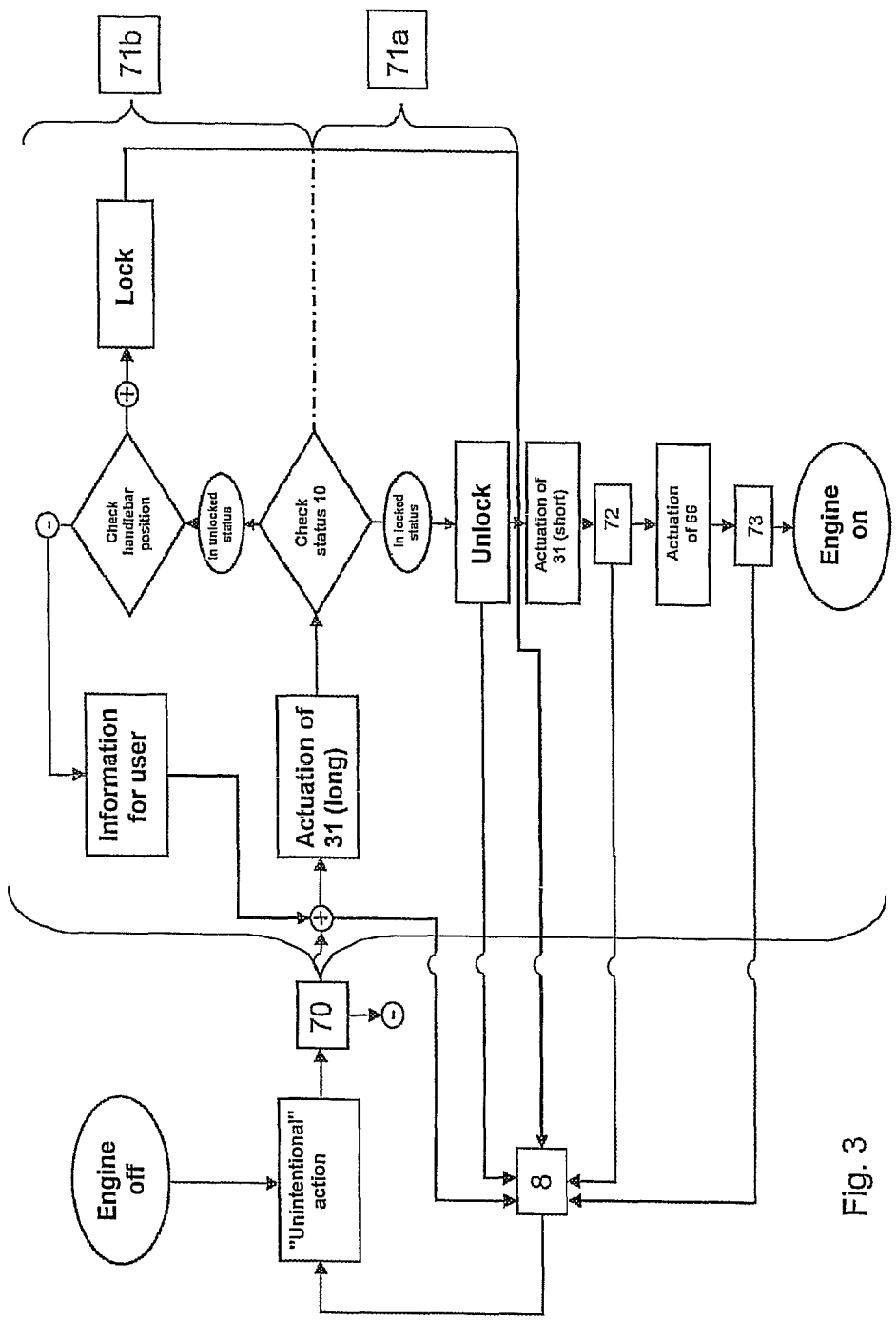
Figure 4:
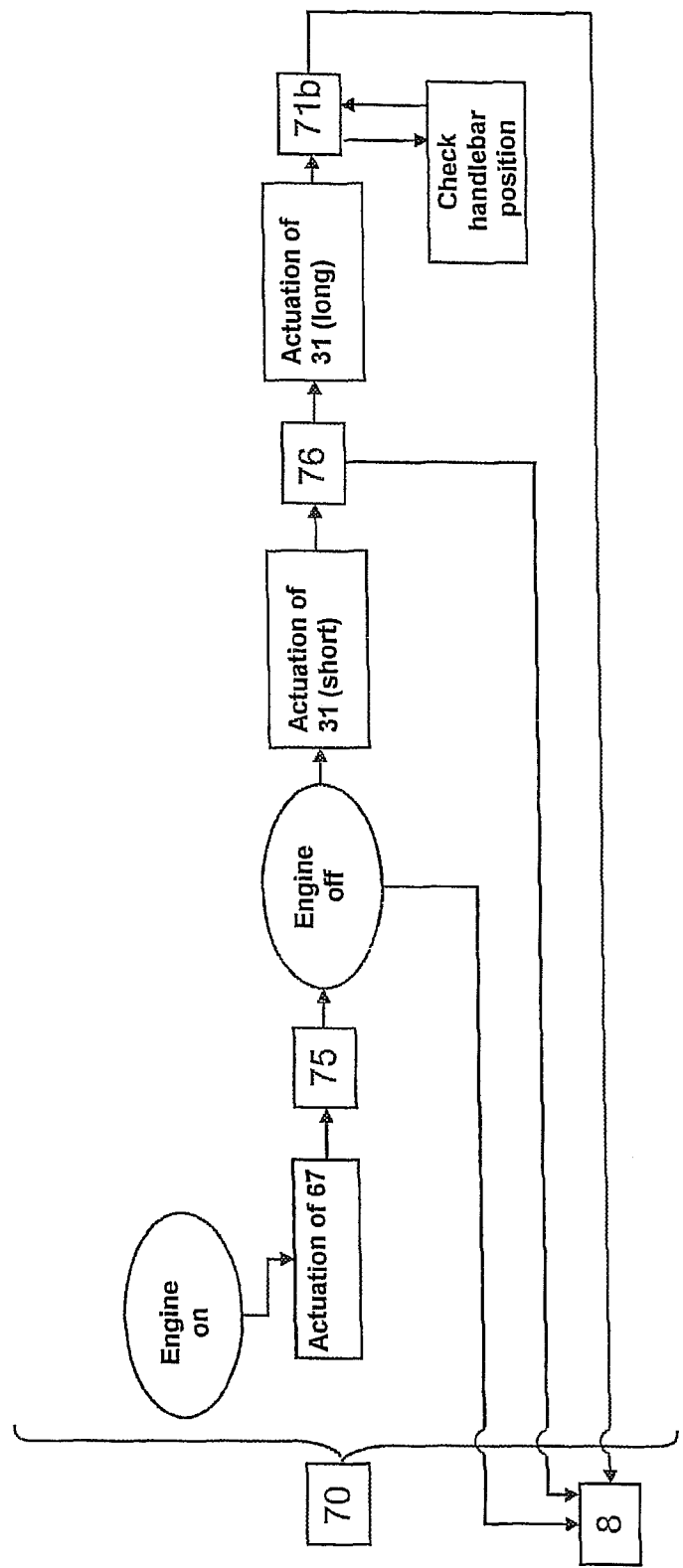
Figure 7:
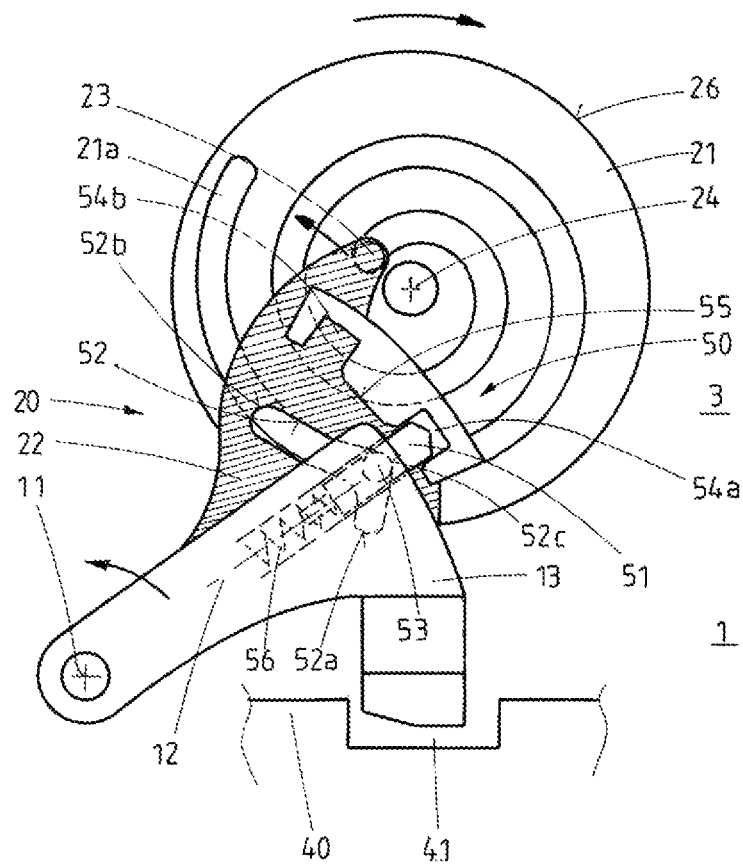
Figures 8, 9:
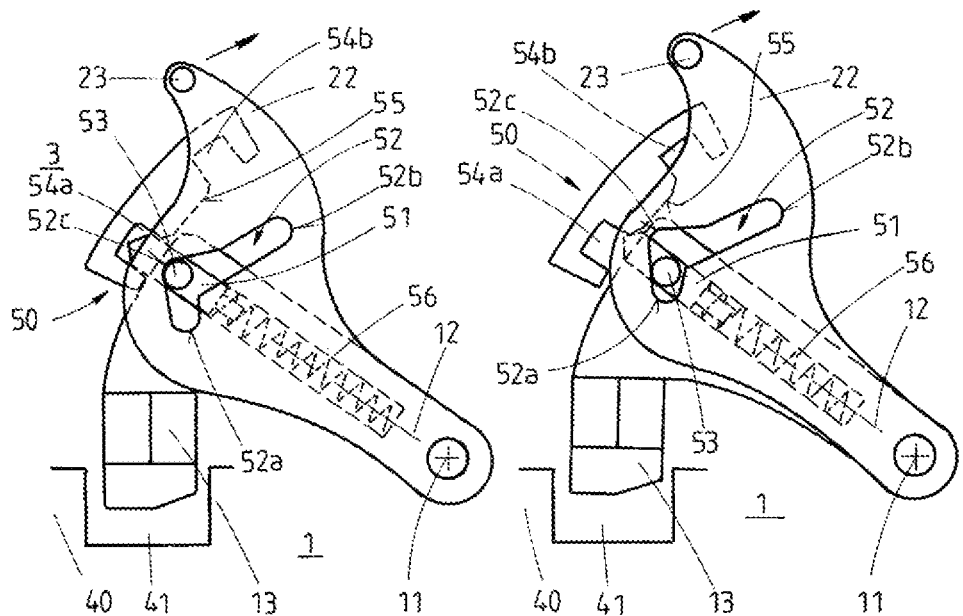
Figures 10, 11:
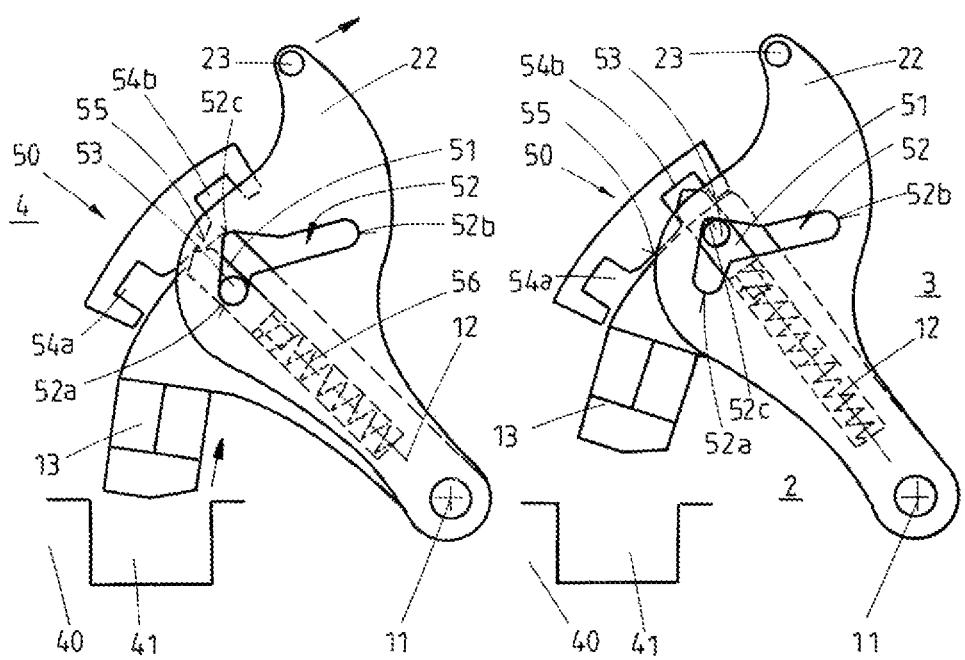
Figure 12:
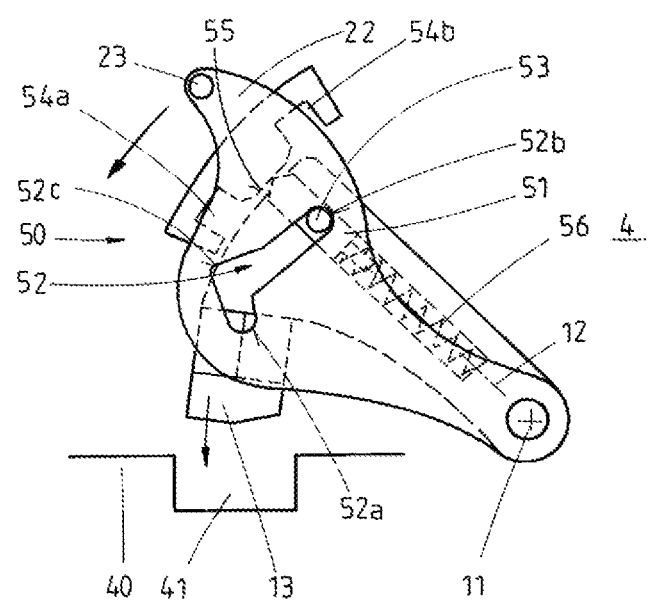

Additional advantages, characteristics and details of the invention can be derived from the following description, in which a potential embodiment form of the invention is depicted using the references to drawings. In this sense, the characteristics named in the claims and in the description can be invention-relevant as stand-alone feature or in any desired combination. The figures show:

FIG. 1 an invention-relevant method for the operation of a control system of a motorcycle to transfer an electromechanical steering lock into its respective position, FIG. 2 an invention-relevant arrangement to control a steering lock of a motorcycle, FIG. 3 an additional depiction of the method per FIG. 1, FIG. 4 an additional depiction of the method per FIG. 1, FIG. 5 a schematic view of the steering lock, which is controlled according to the method per FIG. 1, FIG. 6 the steering lock per FIG. 5, in an additional view, FIG. 7 a side view of the steering lock per FIG. 5, FIG. 8 an additional side view of the steering lock per FIG. 5, FIG. 9 an additional view of the steering lock per FIG. 5, FIG. 10 an additional view of the steering lock per FIG. 5, FIG. 11 an additional view of the steering lock per FIG. 5, and FIG. 12 an additional view of the steering lock per FIG. 5.

FIG. 1 represents in a solely schematic manner a simplified depiction of the invention-relevant method for operating a control system 63 of a motorcycle to transfer an electromechanical steering lock 10 from the unlocked position 2 to a locked position 1, which are shown in FIGS. 5 through 12. FIG. 1 assumes a shut-down engine of the motorcycle 60 (per FIG. 2). When the potential user (motorcycle rider) with an ID-generator 64 approaches the motorcycle 60, an authentication 70 commences "automatically" at a defined distance to the motorcycle 60, which checks to what extent the code contained in the ID-generator 64 matches the motorcycle's own code. The process of authentication 70 can be triggered unintentionally, for example by moving the motorcycle stand, contact with the motorcycle seat, etc. It is also conceivable that the authentication 70 is commenced by a deliberate act, as for example the actuation of a switch or a caliper, or engine start switch, which we will discuss in the following part. The ID-generator 64 maintains a data link with a control system 63 of the motorcycle 60. In addition, the control system 63 maintains a signal connection with an electromechanical steering lock 10 as well as with the ignition system 62 for starting the engine of the motorcycle 60.

After a positive authentication 70, an actuation process 71a, 71b, depicted in a schematic manner in FIG. 3 and FIG. 4 in the method diagram, can be triggered via an activation of an actuation element 31, which maintains signal connection with the control system 63. During the actuation process 71a, 71b, the steering lock 10 is brought from its unlocked position 2 to a locked position 1, or vice-versa, which is depicted in detail in FIGS. 7 through 12. According to the depicted embodiment example, the actuation element 31 is arranged on the steering unit 61 of the motorcycle 60 (refer to FIG. 2). In order to unlock the motorcycle 60, the user—after the positive authentication 70—must deliberately activate the actuation element 31, so that the steering lock 10 can be controlled appropriately. Per subject embodiment example, the actuation process 71a to unlock the steering lock 10 is triggered by longer actuation of the actuation element 31. Per FIG. 3, the control system 63 first checks whether the steering lock 10 is placed in unlocked position 2 or in the locked position 1. If the steering lock 10 is in the locked position 2, an unlock function 71a of the steering lock 10 is carried out.

The standby process 72 is initiated via a renewed, deliberate activation of the actuation element 61 after the mentioned actuation process 71a, during which the power is supplied by the ignition system 62. Compared to the actuation duration needed to trigger the mentioned actuation process 71a, which unlocks the steering lock 10, the duration of actuation to activate the standby process 72 is shorter. The engine start process 73 is activated via a renewed activation of the engine start switch 66 per FIG. 2.

As FIG. 3 depicts, the process of authentication 70 is repeatedly carried out at certain time intervals: during the actuation process 71a, 71b, the standby process 72, the engine start process 73 as well as during the time when the engine of the motorcycle 60 is operational.

Per the embodiment example, the control system 63 changes the position of the steering lock 10 during the actuation process 71a, 71b, in dependence on the current position of the steering lock 10. This means that during the activation of the actuation element 31, which triggers the actuation process 71a, 71b, the control system 63 first checks, in which position 1, 2 the steering lock 10 currently is. If the steering lock 10 is in the locked position 1, unlocking takes place, and if the steering lock 10 is in the unlocked position 2, then locking takes place. The actuation process 71b of the locking function is effected in the way, that during the actuation process 71b, the control system 63 checks the current position of the control unit 61 against a required position. If the current position matches the required position, the steering lock 10 is brought from the unlocked position 2 to the locked position 1. Should the current position not match the required position, the actuation process 71b is interrupted and the user receives information or feedback, that an erroneous position of the steering unit 61 is the case (refer to FIG. 3). Thus, the locking function can only take place when the steering unit 61 rests in a defined position.

In order to shut down the running engine of the motorcycle 60, a deliberate activation of the emergency switch 67 is required (refer to FIG. 2), in which the control system 63 of the ignition system 62 interrupts the power supply. Then the engine is in the shut-down condition, wherein the engine shut-down procedure 75 is only possible under defined motorcycle conditions, monitored by the control system 63. Per FIG. 4, after the successful engine shut-down procedure 75, the shut-down of on-board electronics 76 can be carried out via a renewed activation of the actuation element 31. Subsequently, if desirable, the user can trigger the actuation process 71b, which locks the steering lock 10, via a renewed, longer activation of the actuation element 31. Simultaneously a check is carried out as to what extent the steering unit 61 shows its respectively required position. As is depicted in FIG. 4, the control system 63 repeats the authentication 70 during the engine shut-down procedure 75, during the shut-down of on-board electronics 76 as well as during actuation process 71b, which locks the steering lock 10. As FIG. 3 and FIG. 4 depict, the control system 63 is able to switch to resting mode 77, in the instance that corresponding activation of the appropriate actuation element does not occur. Should the process be in the resting mode 77, the ever-repeating authentication process does not take place.

FIGS. 7 through 12 depict a potential embodiment example of a steering lock 10, which is controlled by the described process. The steering lock 10 features a locking member 13, which can block a function-critical construction part 40, in this case the steering column 40 of the motorcycle 60.

The steering lock 10 features a gear drive 20, which is mechanically coupled to locking member 13. FIGS. 7 and 8 depict the locking member 13 in a locked position 1. The steering lock 10, particularly the locking member 13 is movable from the locked position 1 to an unlocked position 2, via the gear drive 20, as depicted in FIG. 11. In the locked position 1, the locking member 13 extends with its free end into a groove 41 of the steering column 40, which causes the steering column 40 to be locked. In contrast, the locking member 13 is detached from the steering column 40 in the unlocked position 2.

The gear drive 20 features a transfer member 21, which is engineered as drive wheel and turns on a bearing on an axis 24. The transfer member 21 is driven by an electric motor 25, which is depicted in FIG. 5 and FIG. 6. The electric motor 25 features a pinion, which meshes into the cogging area 26 of the transfer member 21. The turning axis 24 of the transfer member 21 and the not depicted turning axis of the pinion are situated parallel to each other, which produces spur-gear cogging between the cogging area 26 of the transfer member 21 and the pinion of the electronic motor 25.

As FIG. 5 and FIG. 6 depict, an actuation unit 30 is provided and accessible to the user, and it maintains a signal connection with the gear drive 20 during normal operation. The gear drive 20 is controlled electronically via a deliberate activation of the actuation element 31, which brings the locking member 13 into its respective position 1, 2, and which is explained in the following part in FIG. 8 through FIG. 12. As depicted in FIG. 5, the actuation unit 30 is mechanically uncoupled from gear drive 20. In the instance of emergency operation, when electronic supply is not provided to relevant construction parts, the actuation unit 30 can be coupled to the gear drive 20 mechanically, by inserting an emergency key 33 into a receptor body 32, particularly the locking cylinder of the actuation unit 30 (refer to FIG. 6). The receptor body 32 is covered by an actuation element 31, which can be seen in FIG. 5. First, this actuation element 31 has to be removed, swung open, or moved away from the receptor body 32 by alternative means, before the emergency key 33 is inserted into the receptor body 32.

The actuation unit 30 is shown in a rest position 5 in FIG. 5. In this rest position 5, the actuation unit 30 is found in a disconnected state from gear drive 20. FIG. 6 depicts the actuation unit 30 in an actuation position 6, in which the actuation unit 30 is found in an effective connection with the gear drive 20. As the emergency key 33 is inserted into the receptor body 32, a translational movement of the receptor body 32 in the direction of transfer member 21 occurs. A form-locking connection exists between both construction parts 30, 21 in the actuation position 6 of the actuation unit 30. A flow of power into the gear drive 20 occurs via a subsequent turn of the emergency key 33 around the axis 24, which in end effect causes a corresponding movement of the locking member 10 over the lever 22.

The unconnected end of the receptor body 32 protrudes per FIG. 5 as well as per FIG. 6 into a bushing 27 situated on the transfer member 21. The interior area of the bushing 27 as well as the unconnected end of the transfer member 21 are geometrically designed in a way that the actuation unit 30 and the transfer member 21 form-fit each other in the actuation position 6, so that a manual turning movement of the emergency key 33 can achieve a reliable activation of the gear drive 20.

Per FIG. 7, the gear drive 20 features a leverage-producing transfer member 21, which acts on the lever 22, which is movably arranged between the transfer member 21 and the locking member 13. In addition, the gear drive 20 features an arresting device 50, which can reliably hold the locking member 13 in its respective position 1, 2. The arresting device 50 features a locking element 51, which is situated in the connecting member 52 of the lever 22. A lobe 53 of the locking element 51, depicted in FIG. 8 through FIG. 12, meshes into connecting member 52. The locking element 51 is arranged on the arresting device 50 in such a way, that the locking element 51 is movable along the connecting member 52, between a first position 3 and a second position 4. In the locked position 1, which is depicted in the FIG. 7 and FIG. 8, and in the unlocked position 2, which is depicted in FIG. 11, the arresting device 50 securely holds the locking member 13, while the locking element 51 is situated in the first extended position 3. In the first position 3, the locking element 51 extends into a first receptor opening 54a, which is firmly arranged on the housing of the invention-relevant device 10.

The locking element 51 is movably arranged with a bearing on locking member 13, wherein it is spring-loaded and situated on locking member 13. The locking element 51 is linearly shiftable along an axis 12 from the first position 3 to the second position 4 and vice-versa. Per FIG. 7, the transfer member 21 features a spiral-formed connecting member run 21a, into which the lever 22 meshes with a protruding contact surface 23. The lever 22 and the locking member 13 are thus situated at a joint axis 11 with ability to turn. The connecting member run 21a is arranged on the side of the transfer member 21, which faces away from the receptor body 32.

Thus, in order to move the locking member 13 from its locked position 1 towards the unlocked position 2 (actuation process 71a), after a positive authentication 70 occurs, an activation of actuation element 31 is carried out, which causes the steering lock 10 to be controlled. The next step is a turn of the transfer member 21 around its turning axis 24. In relation to the embodiment example, the transfer member 21 per FIG. 7 rotates clockwise around the axis 24. This has the effect that the contact surface 23 is swung along the connecting member run 21a, counterclockwise around the axis 11. The turning movement of the transfer member 21 can be carried out via the activation of the actuation element 31 in normal operation, as well as via a manual actuation of the actuation element 31 in emergency operation.

While the lever 22 per FIG. 7 is swung clockwise around the axis 11, which per FIGS. 8 through 11, corresponds to the movement of the lever 22 clockwise around the axis 11, power transfer to the locking member 13 takes place, which exits the locked position 1 per FIG. 7 and FIG. 8 and reaches the unlocked position 2 per FIG. 11. While the lever 22 based on FIG. 8 swings clockwise around turning axis 11, the connecting member 52 of the lever 22 exerts its power to the lobe 53 of the locking element 51, which causes the locking element 51 to move in the direction of axis 11 linearly within the locking member 13. This then causes the locking element 51 to exit the first receptor opening 54a. Furthermore, the connecting member 52 features a first 52a, a second contact surface 52b, as well as an arresting surface 52c. Based on the position of the lobe 53 per FIG. 8, which abuts the arresting surface 52c of the connecting member 52, the lobe 53 moves towards the first contact surface 52a. As long as the lobe 53 has not reached the first contact surface 52a of the lever 22, only a linear shift of the locking element 51 along the axis 12 takes place, without the locking member 13 moving out of its locked position 1. It is only when the lobe 53 per FIG. 10 abuts the first contact surface 52a of the connecting member 52 and the lever 22, via the transfer member 21, swings further around the axis 11, then the power transfer onto locking member 13 occurs, which joins the swinging movement from the locked position 1 towards the unlocked position 2 around the axis 11.

From a certain turning angle of the lever 22, the locking element 51, reaches the second receptor opening 54b, which is depicted in FIG. 11. When this turn position of the lever 22 is reached, a spring, which is arranged within the locking member 13, presses the locking element 51 into the second receptor opening 54b, wherein, at the same time, the lobe 53 of the locking element 51 within the connecting member 52 is pressed towards the arresting surface 52c and remains there. A counter bearing 55 is situated between the first 54a and the second receptor opening 54b, against which the locking element 51 slides along with its free end, during its movement from the first 54a to the second receptor opening 54b and vice-versa.

Starting from the unlocked position 2, which is depicted in schematic manner in FIG. 11, the locking process (actuation process 71b) is carried out in the way, that via an opposite turn of the transfer member 21, meaning in the counter clockwise direction, per FIG. 7, the lever 22 with its contact surface 23 is guided along the transfer member run 21a. Based on FIG. 11, it means that the lever 22 swings counter clockwise around the turning axis 11, while, simultaneously, the lobe 53 of the locking element 51 is pressed from the connecting member 52 of the lever 22, from the arresting surface 52c, towards axis 11. Simultaneously, the lobe 53 moves towards the second contact surface 52b of the connecting member 52, until the lobe 53 actually abuts the second contact surface 52b.

During this movement, the locking member 13 remains unmoved in its unlocked position 2. However, at the same time, the locking element 51 exits the second receptor opening 54b. Is the locking element 51 no longer meshed to the second receptor opening 54b, the second position 4 of the locking element 51 is reached, in which the side of the locking element 51 facing away from the axis 11 comes in contact with the counter bearing 55. It is only upon contact of the lobe 53 with the second contact surface 52b that power transfer occurs via the corresponding counter clockwise movement of the lever 22 around the axis 11, to the locking member 13, which moves from the unlocked position 2 towards the locked position 1, which is explained in FIG. 12. When the appropriate turning angle of the lever 22 is reached, the locking element 51 is pressed by the spring 56 acting from within the locking member 13, into the first receptor opening 54a, so that the locked status per FIG. 8 is reached.

As is explained in FIGS. 8 through 12, the locking element 51, particularly the lobe 53 during the movement of the locking member 13 into its respective position 1, 2 carries out a pendulum movement relative to the lever 22, within the connecting member 52. It means that the lobe 53 runs from the locked position 1 to the unlocked position 2, first from the arresting surface 52c to the first contact surface 52a and subsequently returns to the arresting surface 52c. In contrast, the lobe 53 shuttles from the unlocked position 2 to the locked position 1, starting from the arresting surface 52c, first towards the second contact surface 52b, before the lobe 53 is again guided back to the arresting surface 52c. This specific kinematics warrants a reliable function process while controlling the locking member 13, whereby, at the same time, a very compact arrangement of the gear drive 20 is attained. The relevant elements of the arresting device 50, particularly the locking element 51, in addition to the contour of the connecting member 52, serve simultaneously as necessary construction parts of the gear drive 20, with the goal of attaining an sufficient power transfer from the transfer member 21, via the lever 22, to the locking member 10. In addition to the actual arresting function of the locking element 51, the locking element 51 simultaneously comprises a significant construction part of the gear drive 20, with the goal of bringing the locking member 13 into its respective position 1, 2.

LIST OF REFERENCE CHARACTERS

1 Locked position
2. Unlocked position
3 First position
4 Second position
5 Resting mode
6 Actuation position
10 Steering lock
11 Axis
12 Axis
13 Locking member
20 Gear drive
21 Transfer member
21a Connecting member run
22 Lever
23 Contact surface
24 Axis
25 Electrical motor
26 Cogging area
27 Bushing
30 Actuation unit
31 Actuation element
32 Receptor body
33 Emergency key
40 Function-critical construction part
41 Groove
50 Arresting device
51 Locking element
52 Connecting member
52a First contact surface
52b Second contact surface
52c Arresting surface 53 Lobe
54a First receptor opening
54b Second receptor opening
55 Counter bearing
56 Spring
60 Motorcycle
61 Steering unit
62 Ignition system
63 Control system
64 ID-Generator
66 Third actuation element, engine start switch
67 Fourth actuation element, emergency switch-off
70 Authentication
71a, 71b Actuation process
72 Standby process
73 Engine start process
74 Engine operation
75 Engine shut-down process
76 On-board electronics shut-down
77 Resting mode

The invention claimed is:

1. A method for operating a control system of a motorcycle, comprising:
   moving an electromechanical steering lock from an unlocked position to a locked position and vice-versa, with an ignition system to start the engine of the motorcycle, which is controlled by the controlling system,
   generating an authentication, in which an ID generator maintains a data link with the control system, wherein, after a positive authentication, the steering lock is brought into the appropriate position, in one actuation process,
   providing a first actuation element, which maintains a signal connection with the control system, which is accessible to the user, and the actuation process commences only after a positive authentication, via a deliberate activation of the first actuation element, which occurs after the authentication,
   checking the actual position of the steering unit against the required position by the control system during the actuation process
   in the instance that the actual position matches the required position, the steering lock is brought from the unlocked position to the locked position,
   in the instance that the actual position does not match the required position, the actuation process is abandoned,
   in the instance that the actuation process is abandoned, no movement of the steering lock is carried out from the unlocked position to the locked position absent a subsequent activation of the first actuation element.

2. The method according to claim 1, further comprising:
   effecting the authentication, is effected in the capacitive, inductive manner and via a radio-signal.

3. The method according to claim 1, further comprising:
   situating the first actuation element is situated on the steering unit of the motorcycle.

4. The method according to claim 1, further comprising:
   initiating the authentication is initiated via the first actuation element, separate from the actuation process.

5. The method according to claim 1, further comprising:
   initiating a standby process is initiated via a renewed, deliberate activation of the second actuation element after the actuation process, during which the steering lock has been brought to the unlocked position, and during which the power of the ignition system is supplied, wherein the engine start process is specifically activated via a renewed activation of the third actuation element.

6. The method according to claim 5, further comprising:
   changing the position of the steering lock during the actuation process based on the position of the steering lock by the control system.

7. The method according to claim 1, further comprising:
   abandoning the actuation process causes the user to receive feedback about an erroneous position of the steering unit.

8. The method according to claim 1, further comprising:
   triggering an engine shut-down process during the engine operation via an intentional activation of the fourth actuation element, wherein the control system of the ignition system interrupts the power supply.

9. The method according to claim 8, further comprising:
   triggering the engine shut-down process under defined engine conditions, which are checked by the control system.

10. The method according to claim 8, further comprising:
    effecting the shut-down of on-board electronics via a renewed activation of a fifth actuation element after the engine shut-down process.

11. The method according to claim 10, further comprising
    bringing the steering lock to the locked position, via a renewed activation of the first or second actuation element after the shut-down of on-board electronics.

12. The method according to claim 10, further comprising:
    repeating the authentication after the positive authentication; the authentication process is specifically repeated during the actuation process, the standby process, engine start process, engine shut-down process and the shut-down of on-board electronics.

13. The method according to claim 10, further comprising:
    providing that the first, second and the fourth actuation element jointly constitute a central actuation.

14. The method according to claim 10, further comprising:
    differing the durations of actuation of the central actuation element to activate the actuation process and the standby process, particularly of the actuation process and the shut-down of on-board electronics.

15. The method according to claim 10, further comprising:
    switching to rest mode, in the instance that after a positive authentication, no activation of the central actuation element is effected within a defined time interval.

* * * * *